United States Patent
Bates et al.

(10) Patent No.: US 6,658,653 B1
(45) Date of Patent: Dec. 2, 2003

(54) DEBUGGING METHODS FOR HEAP MISUSE

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 495 days.

(21) Appl. No.: 09/590,579

(22) Filed: Jun. 8, 2000

(51) Int. Cl.$^7$ ................................. G06F 9/44
(52) U.S. Cl. ............ 717/131; 717/125; 717/126; 717/127
(58) Field of Search ............... 717/124, 127, 717/131, 125, 126, 130; 345/467, 471, 472; 707/205, 206, 528, 529, 530, 531; 714/42, 46–48; 711/135, 170

(56) References Cited

U.S. PATENT DOCUMENTS

| | | | | |
|---|---|---|---|---|
| 5,109,336 A | | 4/1992 | Guenther et al. | 395/425 |
| 5,111,384 A | * | 5/1992 | Aslanian et al. | 714/26 |
| 5,408,650 A | * | 4/1995 | Arsenault | 717/124 |
| 5,491,808 A | * | 2/1996 | Geist, Jr. | 711/100 |
| 5,651,136 A | | 7/1997 | Denton et al. | 395/445 |
| 5,652,899 A | | 7/1997 | Mays et al. | 395/773 |
| 5,689,707 A | * | 11/1997 | Donnelly | 707/206 |
| 5,721,917 A | * | 2/1998 | Elliott et al. | 707/202 |
| 5,835,701 A | | 11/1998 | Hastings | 395/183.11 |
| 5,842,019 A | | 11/1998 | Kolawa et al. | 395/701 |
| 5,907,709 A | | 5/1999 | Cantey et al. | 395/705 |
| 5,920,876 A | | 7/1999 | Ungar et al. | 707/206 |
| 6,470,436 B1 | * | 10/2002 | Croft et al. | 711/206 |

OTHER PUBLICATIONS

"OneLook® Search results: modulate," [online] [accessed Dec. 11, 2002], Retrieved from Internet <URL: http://www.onelook.com/?w=modulate&ls=1>, pp. 1–2.*

Randy Sargent et al., "ARC Development System User's Guide," [online] May 6, 1996 [accessed Dec. 10, 2002], Retrieved from Internet <URL: http://www.newtonlabs.com/arc/manual/arc_toc.html>, pp. 1–13.*

Andrew C. Staugaard, Jr., "Structured and Object–Oriented Techniques," 1997, Prentice–Hall, Inc., $2^{nd}$ ed., pp. 585–600.*

Van Wolverton, "Supercharging MS DOS®," 1986 Microsoft Press, pp. 47–69.*

Winchester, "Using the Visual Age for Java Debugger", http://www7.software.ibm.com/va.../Document 2673? OpenDocument&p=1&BCT=3&Footer=, May 26, 2000, 21 pages.

"Using Custom Memory Allocators with Purify on HP–UX, Sun/OS, and Solaris", WWW, Jan. 26, 2000, 9 pages.

Horowitz et al., "Fundamentals of Data Structures in Pascal", Computer Science Press © 1990, pp. 179–195.

Rosenberg, "How Debuggers Work: Algorithms, Data Structures, and Architecture", Wiley Computer Publishing © 1996, pp. 40–53, 101–106, 129–149, 191–193.

* cited by examiner

*Primary Examiner*—Tuan Q. Dam
*Assistant Examiner*—Eric B. Kiss
(74) *Attorney, Agent, or Firm*—Moser, Patterson & Sheridan, L.L.P.

(57) ABSTRACT

The present invention generally provides a method, apparatus and article of manufacture for debugging computer programs. Debugging computer programs is aided by monitoring allocations and deallocations of memory space. The resulting information can be processed to return meaningful data to a user including, for example, a hexadecimal view of memory distinguishing allocated memory from free memory, the allocation/deallocation history of a memory space, a relationship between an allocator and a deallocator, whether a user-established relationship between an allocator and a deallocator was violated, whether a user-established memory limit was exceeded, and the like.

3 Claims, 10 Drawing Sheets

```
                                                         ┌─ 600
001 # INCLUDE <STDLIB.H>
002 CHAR * COPY ( CHAR * P )
003 {
004    CHAR *PTR;
005
006    PTR = MALLOC ( STRLEN (P) + 1 ) ;
007
008    STRCPY ( PTR, P) ;
009
>>010  RETURN PTR;
011 }
```

```
                                                         ┌─ 700
==>ALLOCHIST PTR
              ┌─706      708        710
>ALLOCHIST PTR           /          /
PROC/LINE        LENGTH     PROC/LINE
----------------------------------------
COPY/006          4         F002/026
COPY/006          30        F002/026       } 704
PRINTF/987        128       PRINTF/1005
FOO1/5            48
```

| ALLOCATOR STATEMENT | LIMIT | COUNT |
|---|---|---|
| | 0 | |
| | 0 | |
| | 40K | 40K |
| | 10K | 11K |

```
==> UPSTGIMT  6   4000

001  # INCLUDE <STDLIB.H>
   002  CHAR * COPY (CHAR *P)
   003  {
   004     CHAR * PTR;
   005
>>006  PTR = MALLOC (STRLEN  (P) + 1) ;
   007
   008     STRCPY ( PTR,P ) ;
   009
   010     RETURN PTR;
   011  }

==>
UPPER STORAGE LIMIT OF 4000 EXCEEDED AT LINE 006
```

```
==> EVAL * PTR ; X 20
> EVAL * PTR : X 20
   00000   C8C95A00  00000000 FD9FA372 66001292   -HI!.....Ù*tËÃ..K
   00010   00000000  ........ ........ ........   =................
```

1102 brace on right side of hex dump

Fig. 11

| FREE STATEMENT | ALLOCATOR STATEMENT |
|---|---|
| 3303 | 425 |
| 3303 | 8001 |
|  |  |
|  |  |
|  |  |

Fig. 12

```
==> PARTNERS 6
> PARTNERS 6
FREED AT
PROC/LINE
-------------
FOO1/20
FOO2/40
```

Fig. 13

DEBUGGING METHODS FOR HEAP MISUSE

BACKGROUND OF THE INVENTION

1. Field of the Invention

The present invention relates to computers and computer software. More specifically, the invention is generally related to debugging software.

2. Background of the Related Art

Inherent in any software development technique is the potential for introducing "bugs". A bug will typically cause unexpected results during the execution of the program. Locating, analyzing, and correcting bugs in a computer program is a process known as "debugging." Debugging of programs may be done either manually or interactively by a debugging system mediated by a computer system. Manual debugging of a program requires a programmer to manually trace the logic flow of the program and the contents of memory elements, e.g., registers and variables. In the interactive debugging of programs, the program is executed under the control of a monitor program (known as a "debugger"), commonly located on and executed by the same computer system on which the program is executed, Some of the most difficult problems to debug are those dealing with memory management. Memory types that can be allocated by modern programming languages include static, stack and heap memory. Static allocation binds variables to storage locations at compile and/or link time. Stack allocation pushes an activation frame on the computer stack when a program block prepares to execute. This activation frame contains storage for variables within the scope of execution for the program block. Once the program block completes, the activation frames pop from the stack. Variables stored in the activation frame are not saved from one activation of the block to the next. Heap allocation allows memory for variables to be allocated and deallocated in any order and these variables can outlive the procedure that created them. Once memory is deallocated it is available for reallocation for another use.

During execution of a program, heap storage (in the form of memory blocks) is dynamically allocated and deallocated. Illustratively, in the C programing language allocations are made by malloc statements and deallocations are made by free statements. Memory blocks allocated from heap are accessed by pointers. Various pointer types are known in the art.

A problem occurs when the pointers to a block become obsolete (i.e., no pointers reference the block) but the block remains intact. Such a condition results in loss of available memory. One common mechanism used to remedy this problem is garbage collection. A garbage collector is a run-time component that automatically reclaims heap storage when are no pointers to it.

However, garbage collection is a significant drain on the operation of a system. For this reason, many programming languages such as C and C++ do not provide this feature. Accordingly, programmers using such languages are required to manage memory directly. Such self-management results in problems including freeing memory too early and inadvertently continuing to write to a block which has previously been freed. Freeing memory too early becomes particularly troubling when the memory is reallocated by a second routine which initializes it and then tries to use it. Because the block is still being written to by a routine other than the second routine, the second routine may retrieve corrupted data upon accessing the block. The problem is exacerbated when the application has many threads using the heap.

Therefore, there is a need for a method, article of manufacture and system adapted to address the problems associated with memory management.

SUMMARY OF THE INVENTION

The present invention generally provides an apparatus, program product, and a method for debugging computer programs that address the problems associated with memory management.

One aspect of the invention provides a method for generating allocation and deallocation history information. The method comprises providing one or more functions in code space comprising at least one of a memory allocator and a memory deallocator; recording each call to the one or more functions to generate allocation/deallocation history information for the one or more functions; and allowing a user to retrieve the allocation/deallocation history information.

Another aspect of the invention provides a signal bearing medium containing a program which, when executed by one or more processors, performs the method described above.

Another aspect of the invention provides a computer system comprising an output device, a memory device and one or more processors configured to execute one or more programs. When executed, the one or more programs perform the method described above.

Another aspect of the invention provides a method for managing memory available for dynamic allocation during execution of code including a plurality of memory allocators and a plurality of memory deallocators. The method comprises, for each deallocator called to free a memory block, determining an associated allocator responsible for allocating the memory block; recording association information identifying a relationship between each deallocator called and each associated allocator. In one embodiment, the method further comprises providing output representing the recorded information.

Still another aspect of the invention provides a method for managing memory available for dynamic allocation during execution of code containing a plurality of memory allocators and a plurality of memory deallocators. The method comprises allowing a user to establish a relationship between one or more of the memory deallocators and one or more of the memory allocators, wherein the relationship requires that memory space allocated by the one or more allocators is freed by the one or more deallocators. The method further comprises allowing the code to execute and, upon a call to the one or more deallocators to free a memory space, determining whether the relationship is violated. If so, the user is notified.

Yet another aspect of the invention provides a method for managing memory available for dynamic allocation during execution of code containing a plurality of memory allocators and a plurality of memory deallocators. The method comprises setting an upper limit on the amount of memory space an allocator can allocate during execution the code and, during execution the code, tracking the amount of memory space allocated by the allocator. If the amount of memory space allocated exceeds the limit a user is notified.

Yet another aspect of the invention provides a method for managing memory available for dynamic allocation during execution of code containing a plurality of memory allocators and a plurality of memory deallocators. The method comprises parsing a user-supplied command for a hexadecimal view of a memory space; formatting hexadecimal memory information according to whether memory is allocated or free; and outputting the hexadecimal memory information to an output device in a hexadecimal format.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 11 is a display screen illustrating a heap (hexadecimal) view of the invention.

FIG. 12 is a data structure identifying associated allocators and deallocators.

FIG. 13 is a display screen illustrating a allocator/deallocator identification feature of the invention.

DETAILED DESCRIPTION OF THE PREFERRED EMBODIMENT

The present invention generally provides a method, apparatus and article of manufacture for debugging computer programs. Debugging computer programs is aided by monitoring allocations and deallocations of memory space. The resulting information can be processed to return meaningful data to a user including, for example, a hexadecimal view of memory distinguishing allocated memory from free memory, the allocation/deallocation history of a memory space, a relationship between an allocator and a deallocator, whether a user-established relationship between an allocator and a deallocator was violated, whether a user-established memory limit was exceeded, and the like.

For illustration the invention is described in the context of the C and C++ programming language. However, it is understood that the invention contemplates application with any programming language, known or unknown.

Figure 1:
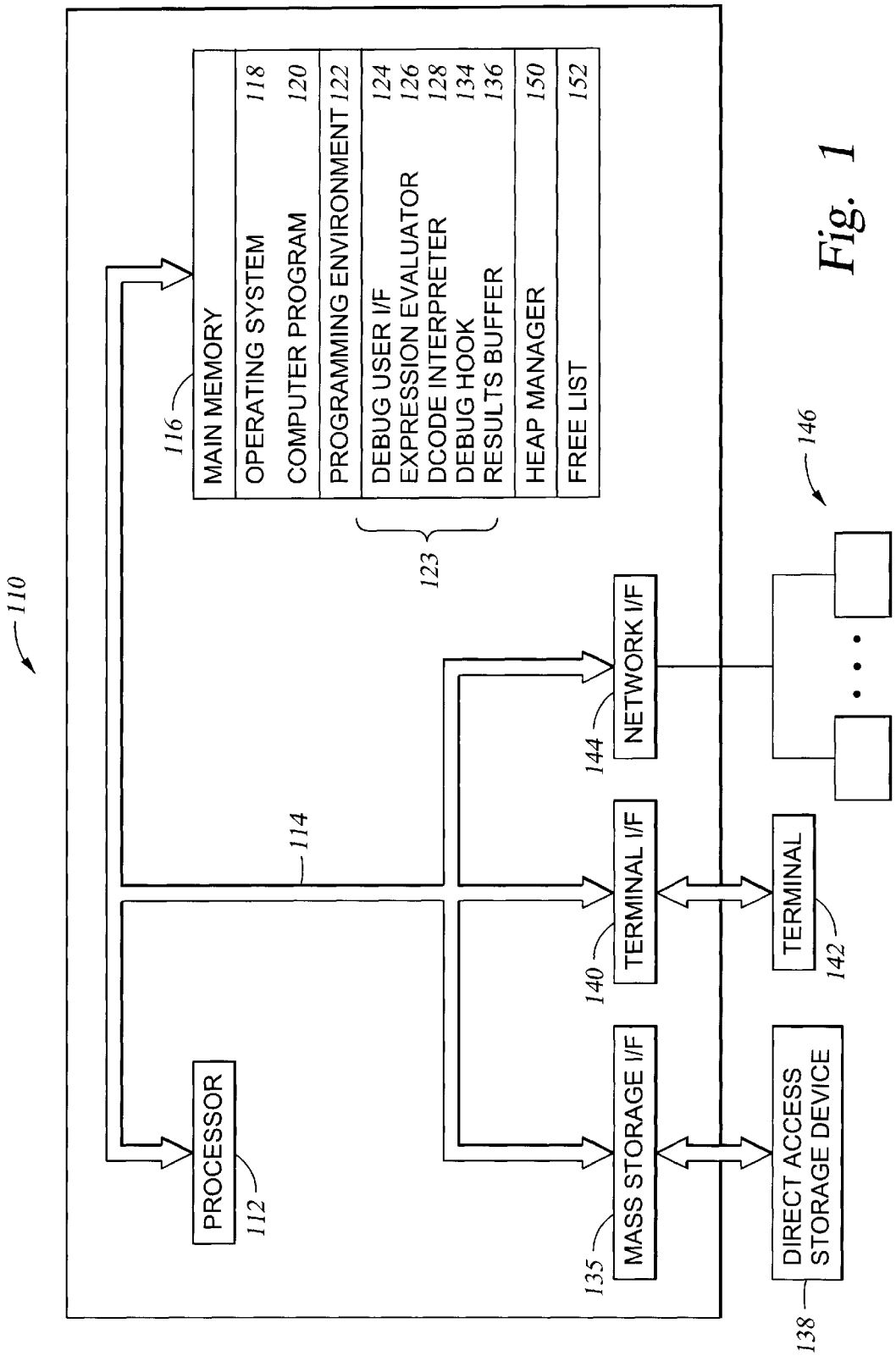
FIG. 1 is a high-level diagram of a computer system consistent with the invention.

Referring now to FIG. 1, a computer system 110 consistent with the invention is shown. For purposes of the invention, computer system 110 may represent any type of computer, computer system or other programmable electronic device, including a client computer, a server computer, a portable computer, an embedded controller, etc. The computer system 110 may be a standalone device or networked into a larger system. In one embodiment, the computer system 110 is an AS/400 available from International Business Machines of Armonk, N.Y.

Computer system 110 is shown for a multi-user programming environment that includes at least one processor 112, which obtains instructions, or operation codes, (also known as opcodes), and data via a bus 114 from a main memory 116. The processor 112 could be a PC-based server, a minicomputer, a midrange computer, a mainframe computer, etc. adapted to support the debugging methods, apparatus and article of manufacture of the invention. In particular, the computer processor 112 is selected to support monitoring of memory accesses according to user-issued commands. Illustratively, the processor is a PowerPC available from International Business Machines of Armonk, N.Y.

The main memory 116 includes an operating system 118, a computer program 120, a programming environment 122 and a heap manager 150. In addition, various data structures are resident in the memory 116 including a freelist 152. The main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 14.

The programming environment 122 facilitates debugging the computer program 120, or computer code, by providing tools for locating, analyzing and correcting faults. One such tool is a debugger program 123 (also referred to herein as the "debugger"). In one embodiment, the debugger 123 is a VisualAge® for C++ debugger modified according to the invention. VisualAge® for C++ for AS/400 is available from International Business Machines of Armonk, N.Y. In a specific embodiment, the debugger 123 comprises a debugger user interface 124, expression evaluator 126, Dcode interpreter 128 (also referred to herein as the "debug interpreter 128"), debugger hook 134, and result buffer 136. Although treated herein as integral parts of the debugger 123, one or more of the foregoing components may exist separately in the computer system 110. Further, although not shown, the debugger may include additional components. For example, debuggers are typically adapted to set and handle control points such as breakpoints and watchpoints. Such control points may be managed by a breakpoint manager.

The computer system 110 could include a number of operators and peripheral systems as shown, for example, by a mass storage interface 135 operably connected to a direct access storage device 138, by a terminal interface 140 operably connected to a terminal 142, and by a network interface 144 operably connected to a plurality of networked devices 146. The terminal 142 and networked devices 146 could be desktop or PC-based computers, workstations, or network terminals, or other networked computer systems.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Figure 2:
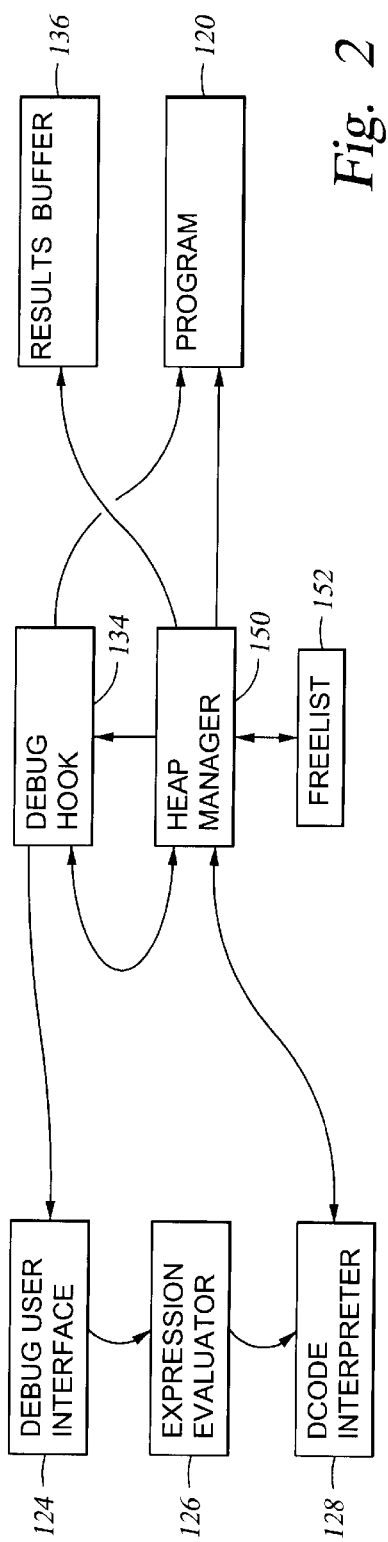
FIG. 2 is a block diagram of an exemplary debugger software environment.

The operational relationship of the debugger program 123, the heap manager 150 and the freelist 152 may be understood with reference to FIG. 2. The debugging capability is illustrated in block diagram form, with the elements shown that contribute to managing and tracking memory allocations/deallocations, and to responding to a system exception. Although shown as separate components, it is understood that one or more of the components may be combined. A debugging process is initiated by the debug user interface 124. The user interface 124 presents the program under debugging and highlights the current line of the program on which a stop or error occurs. The user interface 124 allows the user to set control points, display and change variable values, and activate other inventive features described herein by inputting the appropriate commands. In some instances, the user may define the commands by referring to high-order language (HOL) references such as line or statement numbers or software object references such as a program or module name, from which the physical memory address may be cross referenced.

The expression evaluator 126 parses the debugger command passed from the user interface 124 and uses a data structure (e.g., a table) generated by a compiler to map the line number in the debugger command to the physical memory address in memory 116. In addition, the expression evaluator 126 generates a Dcode program for the command. The Dcode program is machine executable language that emulates the commands. Some embodiments of the invention include Dcodes which, when executed, activate control features described in more detail below.

The Dcode generated by the expression evaluator 126 is executed by the Dcode interpreter 128. The interpreter 128 handles expressions and Dcode instructions to perform various debugging steps. Results from Dcode interpreter 128 are returned to the user interface 124 through the expression evaluator 126. In addition, the Dcode interpreter 128 passes on information to the debug hook 134, which takes steps described below.

After the commands are entered, the user provides an input that resumes execution of the program 120. During execution, control is returned to the debugger 123 via the debug hook 134. The debug hook 134 is a code segment that returns control to the appropriate user interface. In specific embodiments, the debug hook 134 is given control to monitor allocations and/or deallocations of memory. In some implementations, execution of the program eventually results in an event causing a trap to fire. Control is then returned to the debugger by the debug hook 134 and program execution is halted. The debug hook 134 then invokes the debug user interface 124 and may pass the results to the user interface 124. Alternatively, the results may be passed to the results buffer 136 to cache data for the user interface 124. In other embodiments, the user may input a command while the program is stopped causing the debugger to run a desired debugging routine. Result values are then provided to the user via the user interface 124.

The heap manager 150 handles dynamic storage allocation from a working storage area. The heap manager 150 may be part of the operating system 118, or separate from it, and acts to allocate heap memory upon the request of the executing program running in the processor 112.

Working storage is used by the computer system 110 to contain control blocks, buffers, data areas, and state vectors associated with the operation of the computer system in its execution of application programs or other work. Working storage is assigned from a portion of the physical memory (e.g., memory 116) of the computer system 110. Physical memory typically is in the form of semiconductor memory. In a virtual memory environment, it can be augmented by a backing disk store.

When the computer system is first initialized, a certain portion of memory 116 is dedicated as working storage. This storage is then allocated and used for the process of dynamic storage allocation or memory management.

The entire working storage space is initially available for allocation to processor tasks. As the one or more processors 112 process their tasks, storage allocation processes will allocate storage blocks from the working storage area for each task. Each task will be allocated only the amount of storage needed for processing. A storage block of the necessary size will be split from working storage and allocated to the task. The remainder of working storage remains available to other tasks. As the processor completes its tasks, working storage blocks will be returned for reuse. Over time this will result in working storage containing a series of allocated and free areas.

Figure 3:
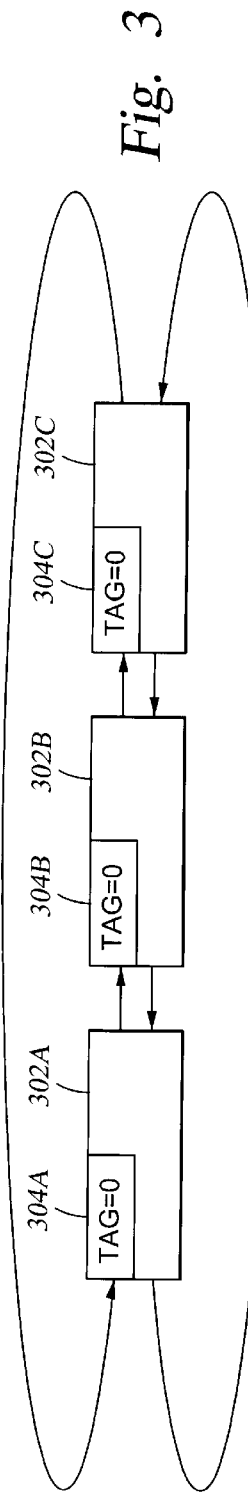
FIG. 3 is a schematic representation of a freelist.

Free working storage is contained in the freelist 152 accessible to the heap manager 150. An illustrative freelist 152 is shown in FIG. 3. The freelist 152 contains a plurality of memory blocks 302A–C representing the available memory space which can be allocated by the heap manager 150. The freelist 152 is preferably doubly linked and contains various fields as are known in the art. Tag fields 304A–C contain a value indicating whether the memory block is free or allocated. When a tag value is set to one (1) the block is allocated, whereas a tag value of zero (0)

indicates that the block is free. Although not shown, the free memory blocks 302 may include additional header information such as the size of the memory block. Additional information about linked lists may be found in *Fundamentals of Data Structures in Pascal, Third Edition*, Ellis Horwitz, Sartaj Sahni, Computer Science Press, New York, ©1976, ©1982, pp. 179–195.

Figure 4:
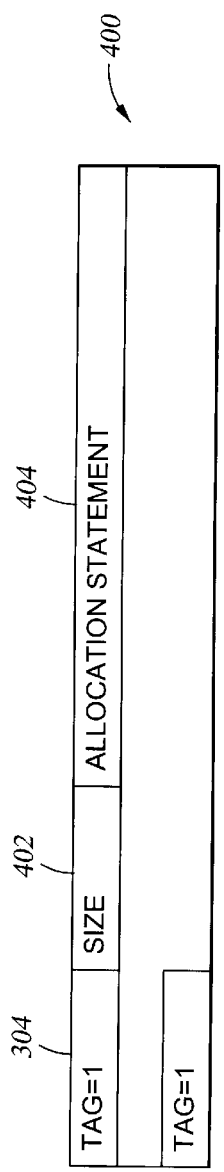
FIG. 4 is a schematic representation of an allocated memory block.

An illustrative allocated memory block 400 is shown in FIG. 4. The value contained in the tag field 304 is set to one (1) indicating that the memory block 400 is allocated. In addition to the tag field 304, the allocated memory block 400 also illustrates a size field 402 and an allocation statement field 404. The size field 402 indicates the size of the memory block 400. The field 404 contains information (referred to herein as the "allocation statement") used by the debugger 123 to uniquely determine where in the source code the memory block was allocated. The precise nature of the allocation statement may depend upon the programming environment but, in general, is any information sufficient to uniquely determine the point of allocation. In one embodiment, for example, the allocation statement can be passed to an allocation routine by a compiler while the program 120 is being debugged. Alternatively, the allocation statement can be generated by examining a call stack. As is known in the art, stacks are memory structures for temporary storage. The contents of the stack can be determined by a process known as "unwinding the stack." These and other methods of generating the allocation statement are known to those skilled in the art.

Allocation History

One embodiment of the invention provides an allocation history for a defined memory space provided to a user in response to a command function. The allocation history may be derived from a data structure generated by the debugger 123. The debugger 123 builds the data structure by tracking memory allocations and deallocations. The data structure can then be utilized to return history information to a user pertaining to the defined memory space of interest. The history information may include the allocation and deallocation history for the memory space, as well as the preceding and subsequent allocators for the memory space and the respective threads for each of the allocators.

Figures 5, 6, 7:
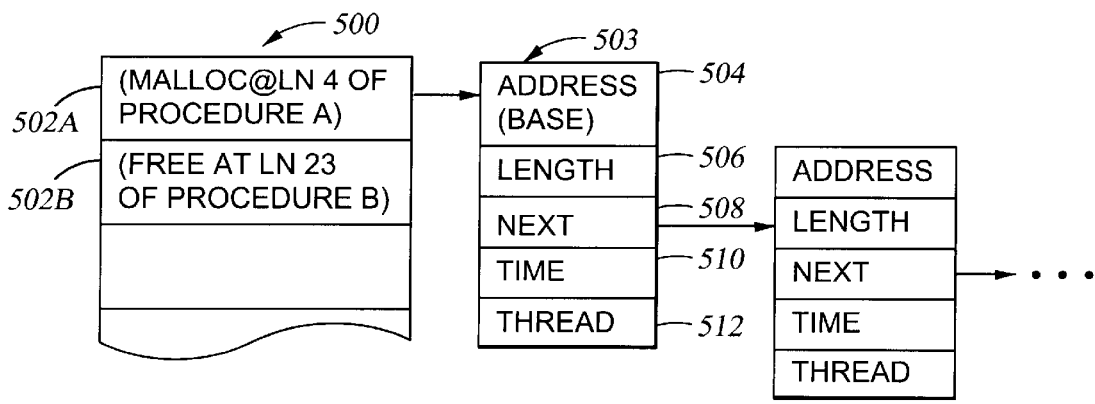
FIG. 5 is a data structure containing allocation and deallocation history information.
FIG. 6 is a display screen containing conventional source code.
FIG. 7 is a display screen containing allocation history for a memory space.

One example of a history data structure 500 (also referred to herein as the Ahistory table 500") that can be used to advantage is shown in FIG. 5. The history table 500 contains one entry 502 for each allocator and deallocator contained in the program 120 being debugged. Symbolic identifiers for an allocator and a deallocator are shown in the first and second entries 502A and 502B, respectively, of the history table 500. The information contained in the entries 502 is preferably sufficient to uniquely identify the location of the allocator/deallocator (i.e., the function in the program 120). For example, the function may be mapped to a particular line number of a particular procedure using mapping methods known in the art. Illustrative methods for mapping the location of allocators were described above with reference to FIG. 4. Similar mapping techniques can be used to advantage for deallocators.

In one embodiment, each entry 502 points to a number of records 503 for memory spaces allocated or deallocated by the function of the respective entry 502. Each record 503 includes an address field 504, a length field 506, a pointer field 508, a time field 510 and a thread number field 512. The address field 504 contains the base address for the memory space affected by the function. The length field 506 contains the length of the memory space. Illustratively, the units of length may be bytes, however, other units of length may be used depending on granularity. The thread number field 512 contains an identifier mapped to the thread number responsible for the allocation/deallocation. The pointer field 508 contains a pointer to the subsequent record 503 for a given entry 502. Accordingly, the records 503 comprise a linked list for a particular memory allocation/deallocation function. The time field 510 contains a value indicating when the memory space was allocated/deallocated relative to subsequent records 503 of the linked list for the same entry 502.

In operation, the history table 500 may be scanned to generate history data for a particular allocator or deallocated. One embodiment utilizing the history table 500 may be illustrated with reference to FIGS. 6 and 7. FIG. 6 shows a display screen 600 containing source code numbered by statement lines. When executed, the source code is intended to return a copy of a string in allocated memory. A pointer ("ptr") is shown pointing to allocated memory. A ">>" prompt indicates the current stop position in the execution of the code.

In order to invoke the allocation history feature of the invention, a user may provide a command recognizable by the debugger 123. An illustrative command is shown in FIG. 7 which depicts a display screen 700 displaying a command prompt "→." The command "Allochist ptr" is input at the command prompt and indicates that a user is interested in the allocation history for the memory space pointed to by the pointer "ptr". The allocation history for the memory space is shown in the display screen region 704. A first column 706 of the allocation history indicates the procedure and line number of a call to allocate a memory block which contained an address to the memory space of interest (i.e., the memory space pointed to by the pointer "ptr"). A second column 708 indicates the size of the memory block allocated. A third column 710 indicates the procedure and line number where the allocated block is subsequently deallocated. Preferably, each row of the allocation history is ordered chronologically, beginning with the most recent allocation.

Examination of the allocation history facilitates an understanding of how a particular memory space was managed. Accordingly, a user is provided with a convenient way of determining the source of memory corruption. Those skilled in the art will readily identify other advantages provided by the invention.

Upper Active Storage Limit Trap

Another embodiment allows for a limit to be placed on the amount of active memory that can be allocated by a call to a particular allocator at any given time. Programmers are often concerned with working set sizes and related memory leaks. The present invention provides a programmer with additional control over memory management.

Figures 8, 9, 10:
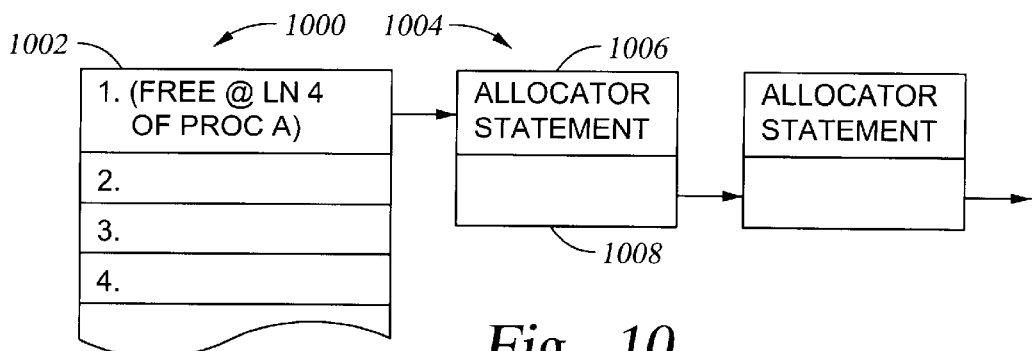
FIG. 8 is a data structure containing an array of pointers to allocators, user-established memory limit parameters pertaining to each allocator, and an allocation size counter.
FIG. 9 is a display screen illustrating an upper memory limit feature of the invention.
FIG. 10 is a data structure containing an array of pointers to deallocators and user-established associations between the deallocators and allocation statements.

One embodiment of the invention (referred to herein as the "upper active storage limit trap" or the "memory limit trap") utilizes a data structure to track the amount of memory currently allocated by a particular allocator. An illustrative upper storage limit table 800 is shown in FIG. 8. The table 800 includes an allocator column 802, a memory limit column 804, and a count column 806. The allocator column 802 provides an entry field for a particular allocator (e.g., a malloc statement at line 4 of procedure A). The allocator column 802 may contain any number of entries. For each allocator specified in column 802, a user may supply an upper limit parameter which is stored to the respective cell of the memory limit column 804. During execution of the program 120, the debugger 123 tracks calls to each allocator contained in the table 800. When the allocator is called to allocate additional memory, the counter value (contained in column 806) for the respective allocator is incremented. Conversely, when memory space allocated by the particular allocator is freed the counter value is decremented. If, at any time, the value of the counter exceeds the value set by the user (the value contained in the memory limit column 804), execution of the program is halted and the user is notified of the fault.

An implementation of the memory limit trap can be illustrated with reference to FIG. 6 and FIG. 9. FIG. 6 was described above. FIG. 9 depicts a display screen 900 and shows a user input command ("upstglmt 6 4000") by which the user sets a memory limit of 4000 bytes on a particular allocator. The particular allocator is identified by line number 006 which specifies that the limit is applied to the allocator that is called at line 006 of the program under debug. The program being debugged is then allowed to continue execution. If the conditions set by the user parameters are met, execution of the program is halted and the output shown in region 904 of the display screen 900 is presented to the user. The output includes a function of the source code and a prompt (">>") indicating that execution of the program was halted on line 006 of the function. Additionally, a message is displayed at the lower end of region 904 describing why execution of the program was halted. Specifically, the message indicates that the memory limit set by the user was exceeded at line 006 of the function.

Producer-Consumer Validation

In another embodiment, a user may specify that memory allocated by a particular allocator should only be freed by specified deallocation routines. Thus, an association is made between allocators and deallocators such that deallocations in violation of the association will cause execution of a program to halt. Alternatively, a user may specify that memory deallocated by a particular deallocator should only be allocated by specified allocation routines. For simplicity only the former implementation is described.

In some embodiments, such a feature allows a user to correct problems resulting from improper pointer dereferencing. One such problem occurs when a pointer is not dereferenced far enough resulting in freeing the wrong memory block.

In one embodiment of the invention, the user-designated associations may be tracked in a table. An illustrative producer-consumer table 1000 is shown in FIG. 10. The table 1000 comprises an array of pointers to records 1004. Each entry 1002 of the table 1000 contains a call to a deallocator. In one embodiment, each entry 1002 may contain an index number mapped to a particular deallocator. Mapping techniques that can be used to advantage are described above. A symbolic representation to a deallocator at line 4 of Procedure A is shown in a first entry 1002 of the table 1000. Each of the records 1004 associated with each deallocator includes a field 1006 containing an allocator statement. In one embodiment, the deallocator information contained in each entry 1002 and the allocator statement contained in the field 1004 are mapped to unique locations in code space in response to user supplied parameters. The records 1004 are linked by pointers contained in a pointer field 1008.

In operation, the heap manager 150 takes steps to write an allocation statement into the field 404 of an allocated memory block 400 (described above with reference to FIG. 4) for each instance of memory allocation. Upon deallocation the debug hook 134 is called and compares the allocation statement contained in the field 404 with the allocation statement in the field 1006 of each of the records 1004 according to the particular deallocator called to free the memory block 400. If the allocation statement contained in the field 404 cannot be matched with one of the allocation statements of the records 1004 execution of the program is halted the debug interface 124 is called.

Heap View (Also Referred to Herein as "The Hexadecimal View")

Many conventional debuggers provide the user with a hexadecimal view of the state of memory. In one embodiment of the invention, a hexadecimal view is provided with attributes indicating whether the memory is allocated or free. In some embodiments, the hexadecimal view may also indicate whether the memory is heap, automatic or static memory. In operation, each byte of memory is written to a buffer in hexadecimal format. The heap manager 150 is then called to determine whether the byte is allocated or free. Results indicating the status of the byte and then returned to the user interface 124.

Allocated memory may be distinguished from free memory using any of a variety of formatting attributes. For example, the hexadecimal strings representing free memory may be highlighted. The highlighting may be a degree of shading or may be a particular color (e.g., green) designated for free memory.

An implementation of the heap view can be illustrated with reference to FIG. 6 and FIG. 11. FIG. 6 was described above. FIG. 11 shows a display screen 1100 containing a hexadecimal view of memory. The hexadecimal view is provided in response to a user input command ("eval *ptr : X 20) at a prompt ("→"). The command indicates a user request for a heap view of the memory pointed to by the pointer "ptr" and for a length of 20 bytes. In the particular implementation illustrated in FIG. 11, the attribute used to indicate allocated memory is underlining. Accordingly, allocated memory is displayed with underlining and free memory is displayed without underlining. An output portion 1102 represents the value of the string which is copied by the procedure shown in FIG. 6.

Identification

In another embodiment, the debugger 123 tracks allocators and deallocators to determine a relationship. For example, a user may specify a particular deallocator such that the debugger 123 identifies the allocator that allocated the memory space freed by the specified deallocator. Conversely, the user may specify a particular allocator such that the debugger 123 identifies the deallocator that freed the memory space allocated by the specified allocator.

One implementation of the identification embodiment uses to advantage an identification table, such as the table 1200 shown in FIG. 12. The table 1200 includes a free statement column 1202 and an allocation statement column 1204. The free statement column 1202 contains unique identifiers which map to particular deallocators within the program 120 (i.e., each identifier maps to a statement/line number of a deallocator in code space). Illustratively, a first two entries of column 1202 contain a numeric identifier 3303. The allocator statement column 1204 contains unique identifiers which map to particular allocators within the program 120 (i.e., each identifier maps to a statement/line number of an allocator in code space). Illustratively, a first and a second entry of the column 1204 contain numeric identifiers 425 and 8001, respectively. Mapping techniques that can be used to advantage are discussed above.

During execution of the program 120, the debugger 123 populates the fields of the deallocator statement column 1202 for each call to a deallocator. Additionally, the allocator which allocated the memory space now being freed is stored to a field of the allocator statement column 1204. The deallocator and related allocator are stored in the same row. Thus, for example, the deallocator identified by numeral 3303 is paired with the allocator identified by numeral 425.

When displayed on an output device, the information contained in the table 1200 enables a user to identify that the memory space freed by deallocator 3303 was initially allocated by allocator 425. A user may use this information to advantage, for example, to determine whether multiple routines are affecting a particular memory space resulting in memory corruption.

An implementation of the identification feature can be illustrated with reference to FIG. 6 and FIG. 13. FIG. 6 was described above. The output provided to a user may be illustrated with reference to FIG. 13 showing a display screen 1300. The output may be provided in response to a user command ("partners 6") input at a command prompt ("→"). Illustratively, the command indicates that the user is interested in knowing where the memory allocated at statement/line 006 is being freed at. An output region 1302 indicates the procedure and line number at which memory allocated by the specified allocator was freed.

The embodiments and data structures described above are merely illustrative. Persons skilled in the art will readily recognize other embodiments contemplated by the invention. Embodiments of the invention can be further understood with reference to the flow diagrams described below.

Figure 14:
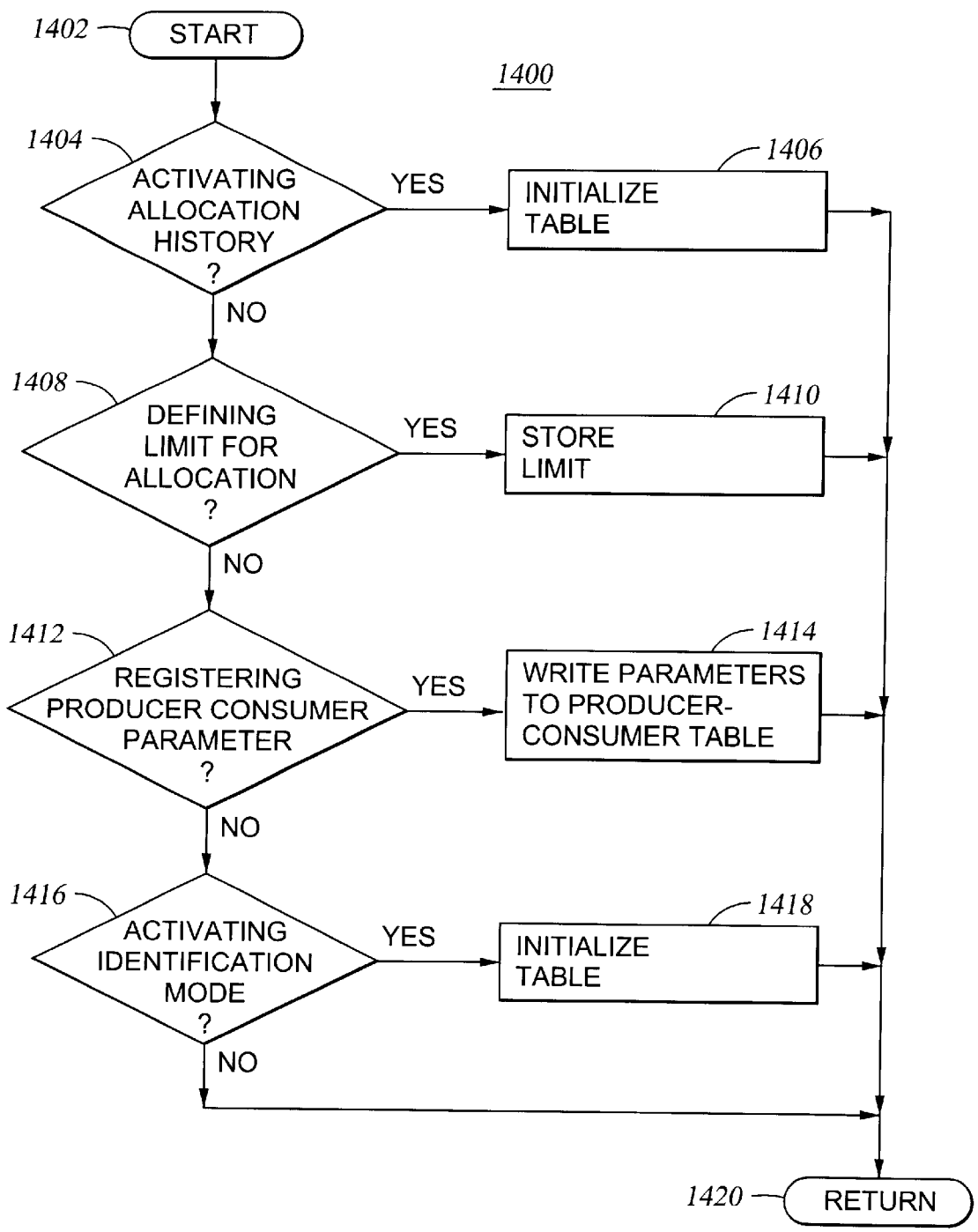
FIG. 14 is a flow diagram of a debug interpreter illustrating user activation of inventive features.

Referring first to FIG. 14, a method 1400 is shown illustrating the operation of the debug interpreter 128 in response to user-issued commands to activate the various features of the invention. The method 1400 is entered at step 1402. At step 1404, the method 1400 queries whether the user is activating the allocation history feature. If so, the history table 500 is initialized at step 1406. The method 1400 then returns at step 1420.

If step 1404 is answered negatively, the method 1400 proceeds to step 1408 and queries whether the user is defining a memory limit for a particular allocator. If so, the limit is stored to a field of column 804 of table 800 at step 1410. The method 1400 then returns at step 1420.

If step 1408 is answered negatively, the method 1400 proceeds to step 1412 and queries whether the user is supplying producer-consumer values (i.e., allocators and deallocators). If so, at step 1414, the parameters restored to the producer-consumer table 1000 in the manner described above. The method 1400 then returns at step 1420.

If step 1412 is answered negatively, the method 1400 queries (at step 1416) whether the user is activating the identification mode. If so, the identification table 1200 is initialized at step 1418. The method 1400 then returns at step 1420.

The foregoing activation steps are preferably performed prior to initiating a debugging session. However, it is understood that activation of any of the inventive features may be done by user at any time during the debugging session. Additionally, the debugger 123 may be configured such that one or more of the inventive features are default settings of the debugger 123.

Figure 15:
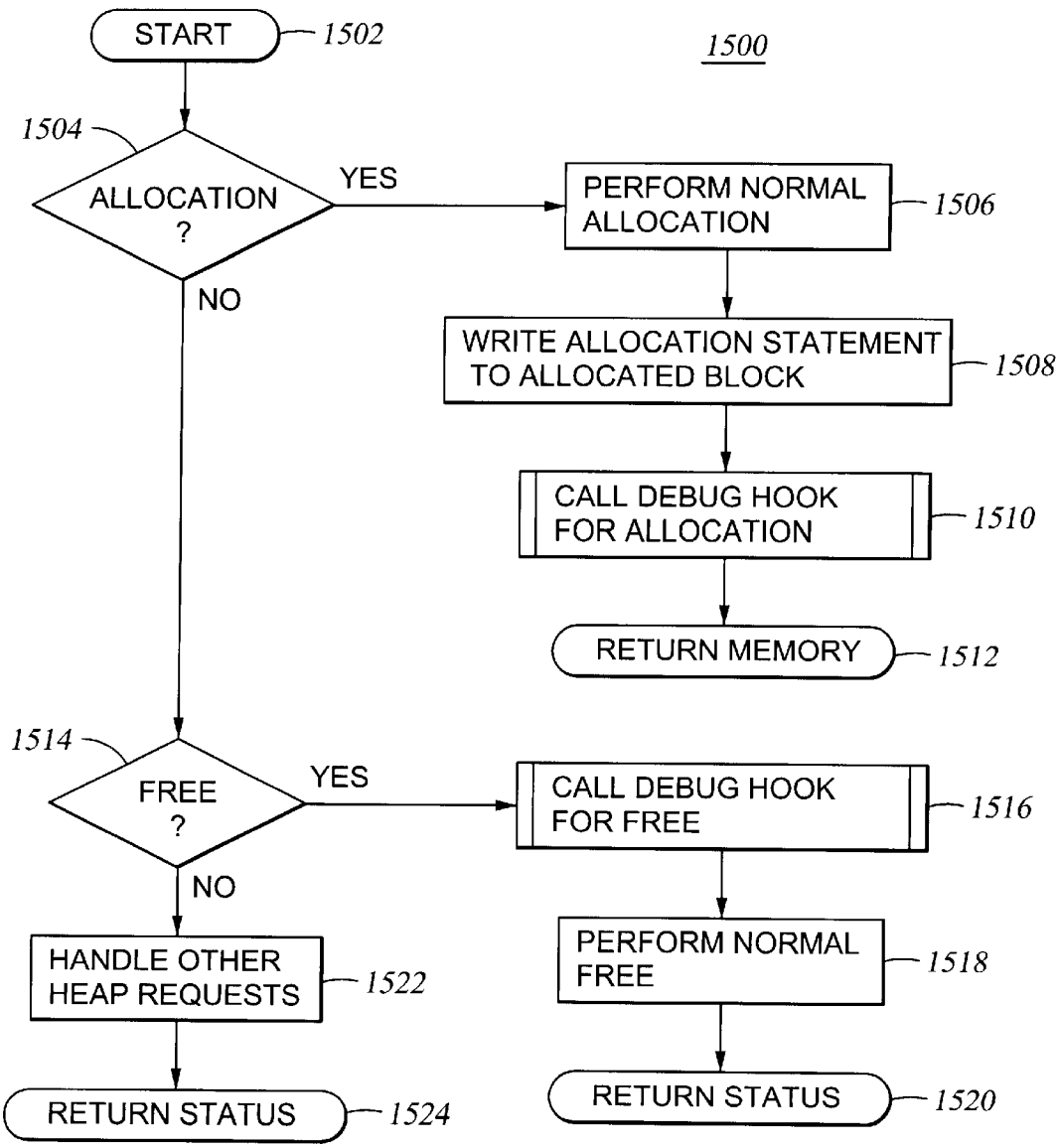
FIG. 15 is a flow diagram illustrating the operation of a heap manager.

Referring now to FIG. 15, a method 1500 is shown illustrating the operation of the heap manager 150. The method 1500 is entered at step 1502. At step 1504, the method 1500 queries whether the heap manager 150 is called to perform a memory allocation. If so, the memory is allocated in a conventional manner at step 1506. At step 1508, the allocation statement is written to the field 404 of the allocated block 400. At step 1510, the debug hook 134 is called with the appropriate parameters being passed thereto. The operation of the debug hook 134 will be described below with reference to FIG. 16. The allocated memory is then returned for use by the program 120 at step 1512.

If step 1504 is answered negatively the method 1500 queries (at step 1514) whether the heap manager 150 is called to free memory. If so, the debug hook 134 is called at step 1516 to perform steps described below with reference to FIG. 16. The heap manager 150 then performs a conventional free operation at step 1518. A status of the operation is returned at step 1520.

If the heap manager 150 is called neither for allocation nor deallocation of memory, the method 1500 proceeds to step 1522 where other requests are handled by the heap manager 150. Additional steps include determining the state of memory (i.e., whether a given memory space is allocated or not) for purposes of the heap view feature described above and further described below. For such an event, the state of the memory is returned at step 1524.

Figure 16:
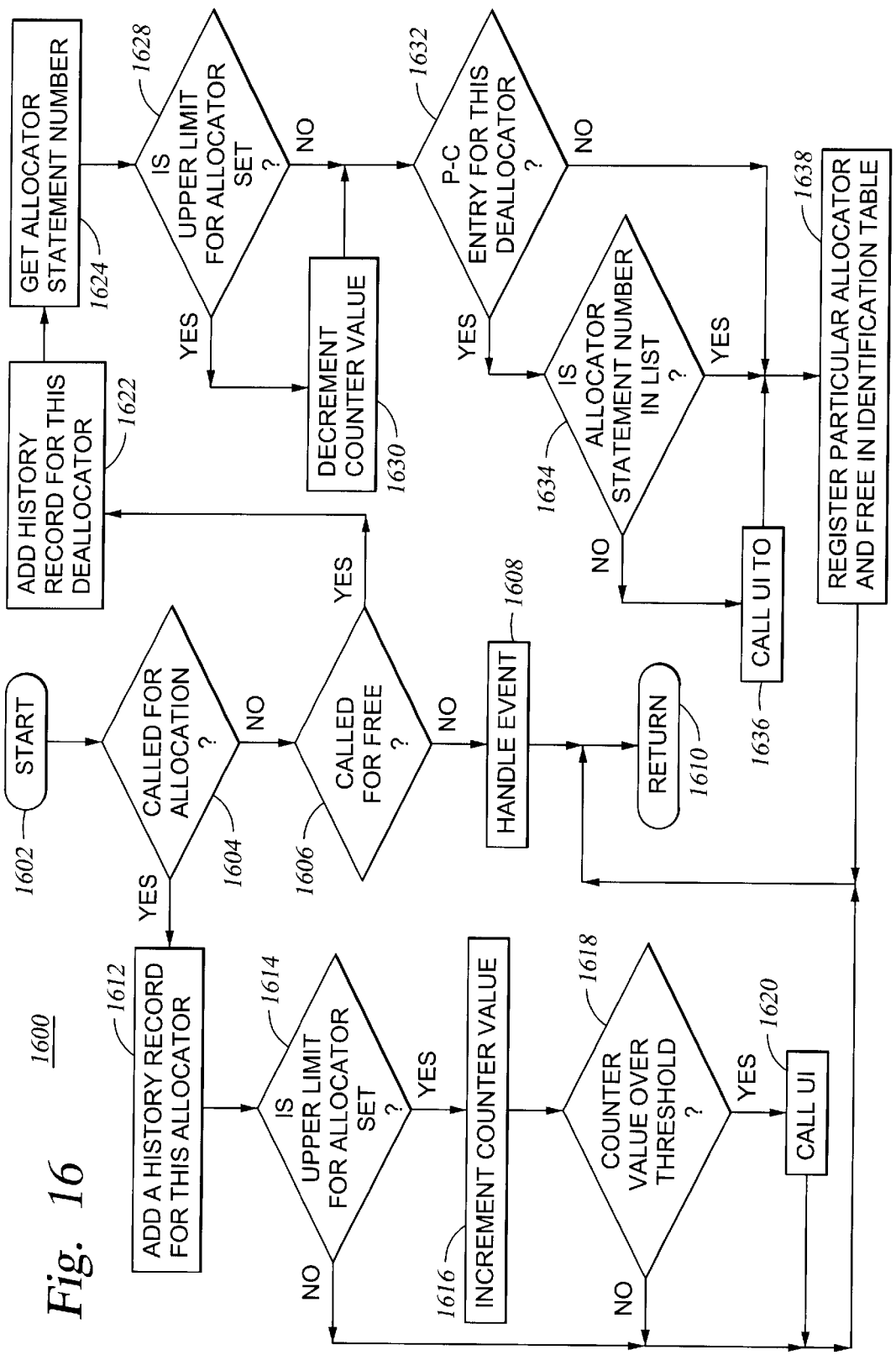
FIG. 16 is a flow diagram of a debug hook.

A method 1600 illustrating the operation of the debug hook 134 is shown in FIG. 16. The method 1600 may be entered at step 1602 from either step 1510 (when memory is allocated) or step 1516 (when memory is freed). The method 1600 may also be entered when the debug hook 134 is called to handle other events known in the art.

At step 1604 the method 1600 queries whether the debug hook 134 was called for memory allocation. If not, the method 1600 proceeds to step 1606 and queries whether the debug hook 134 was called for memory deallocation. If not, the method 1600 proceeds to step 1608 where other events known in the art are handled. The method 1600 then returns at step 1610.

If the debug hook 134 is called for allocation at step 1604, then at step 1612, a record 503 is created in the history table 500 (for the particular allocator called) in the manner described above. If an identifier (e.g., index number) mapped to the allocator is not already contained in an entry of the table 500, one is stored to the table 500 prior to creating the record 503. If an entry for the allocator already exists in the table 500, the newly created record 503 is appended to the list of any already existing records. As described above, the records 503 are linked by pointers. Accordingly, for each call to an allocator, another record 503 is created and linked to previous records 503.

The method 1600 then proceeds to step 1614 to query whether an upper memory limit is set for the allocator. This determination may be made by referencing column 802 and column 804 of the upper active storage limit table 800. If a memory limit has been set, the method 1600 proceeds to step 1616 where the counter value contained in column 806 is incremented by the size of the allocated memory. At step 1618, the method 1600 queries whether the counter value for the allocator (contained in column 806) exceeds the set limit for the allocator (contained in column 804). If not, the method 1600 returns at step 1610. Otherwise, the user interface 124 is called to signal the condition at step 1620. The method 1600 then returns at step 1610.

If the debug hook 134 is called for a deallocation at step 1606, the method 1600 proceeds to step 1622 where a record 503 is added to the history table 500 for the particular deallocator. As with allocations handled at step 1612, the deallocator must first be mapped to an entry of the table 500. Once an entry for the deallocator exists in the table, a record 503 is generated at step 1622 for each call to the deallocator.

At step 1624 the allocation statement contained in the field 404 of the memory block 400 being freed is retrieved. The allocation statement may be provided to the debug hook 134 by the heap manager 150. As described above, the allocation statement uniquely identifies the allocator responsible for allocating the block 400. At step 1628, the method 1600 queries whether a memory limit was set for the allocator identified by the allocation statement. The processing at step 1628 is substantially the same as that described with reference to step 1614. If a memory limit exists for the allocator, the counter value contained in column 806 of table 800 is decremented at step 1630 by the size allocated.

At step 1632, the method 1600 queries whether an entry exists in table 1000 for the deallocator being processed. If so, the method 1600 proceeds to step 1634 and queries whether the allocator statement retrieved at step 1624 is in the list of records 1004 associated with the particular deallocator. That is, a determination is made as to whether a user-established relationship exists between the deallocator freeing the block 400 and the allocator which initially allocated the block 400. If step 1634 is answered negatively, then at step 1636 the user interface 124 is called to signal a violation of the producer-consumer relationship established by the user.

If step 1634 is answered affirmatively, the method 1600 proceeds to step 1638. At step 1638, the debug hook 134 registers a relationship between the deallocator being processed and the allocation statement of the memory block 400 being freed by the deallocator. In one embodiment, the relationship is registered in the identification table 1200 described above with reference to FIG. 12. The method 1600 then returns at step 1610.

Figure 17A:
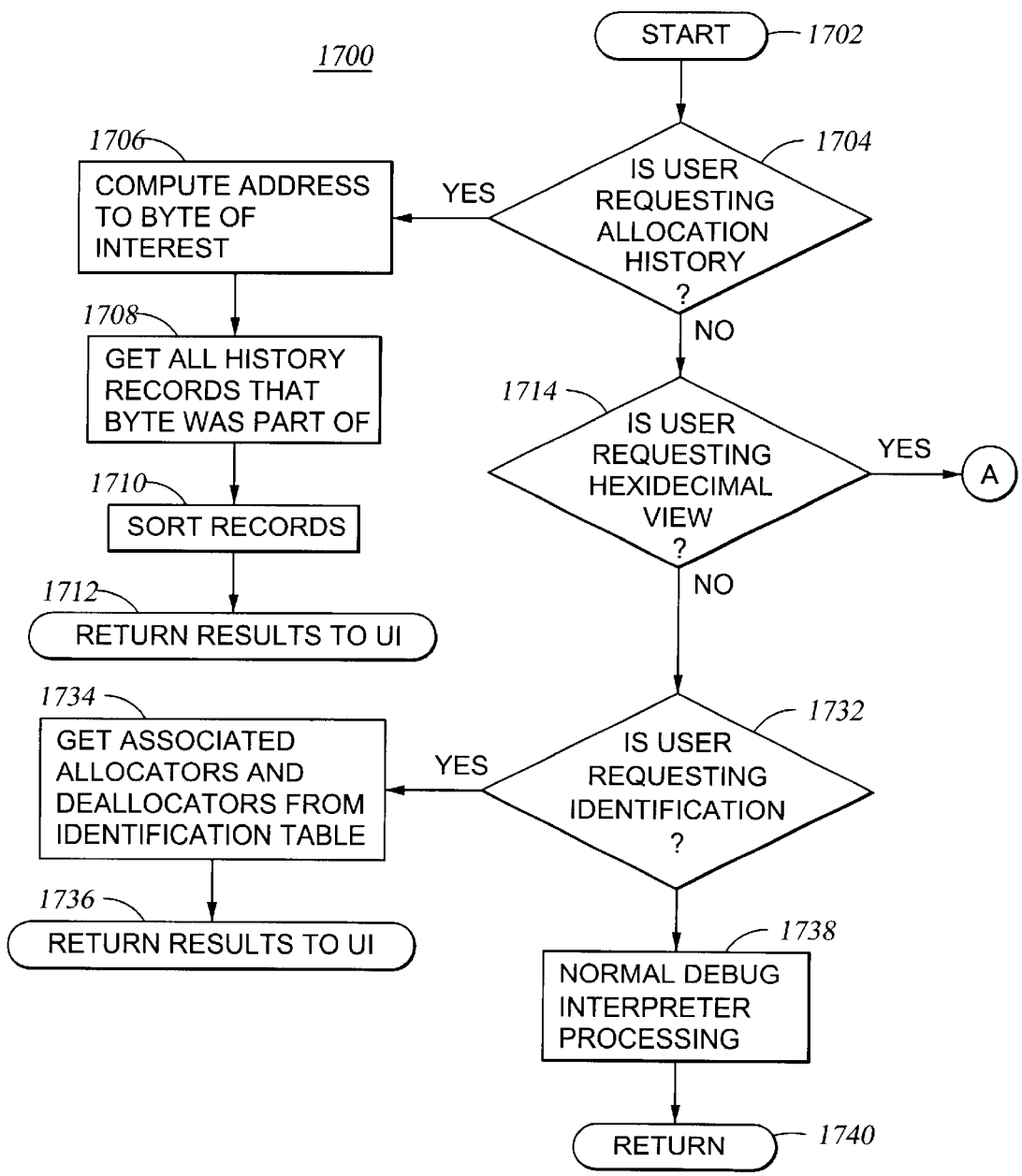
FIGS. 17A and 17B are a flow diagram of a debug interpreter.
Figure 17B:
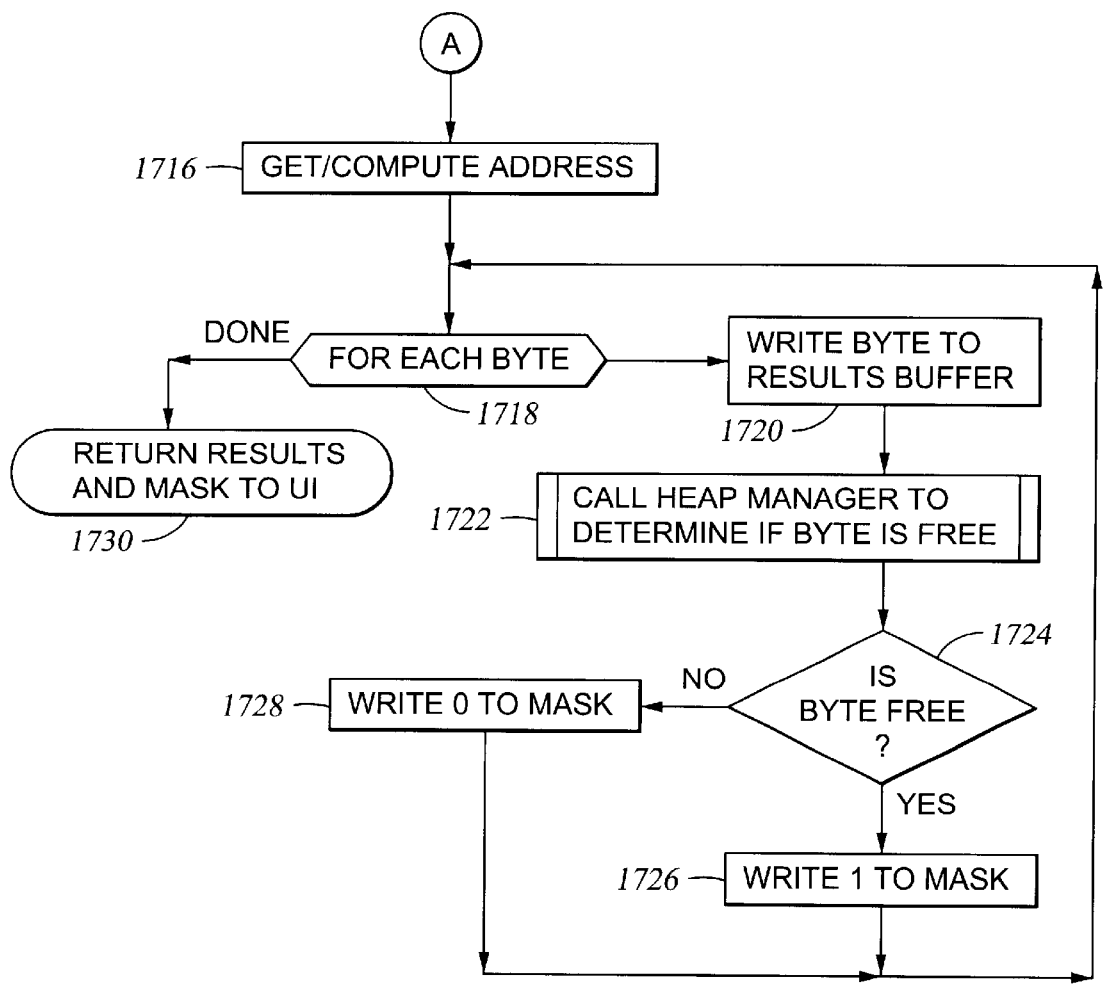

FIGS. 17A and 17B show a method 1700 illustrating the operation of the debug interpreter 128. The method 1700 is entered at step 1702 and then proceeds to step 1704 to query whether the user is requesting an allocation history. As described above with reference to FIG. 7, a request for the allocation history may be made by the user by providing the debugger 123 with a pointer. If the user is requesting an allocation history, the address of the memory space pointed to by the pointer is computed at step 1706. At step 1708, the debug interpreter 128 scans the history table 500 and locates each record 503 containing the address computed at step 1706. At step 1710, the records 503 located at step 1708 are sorted chronologically from newest to oldest utilizing the time field 510 of each record 503. The results are then returned to the user interface 124 at step 1712.

If step 1704 is answered negatively, the method 1700 proceeds to step 1714 and queries whether the user is requesting hexadecimal view of memory such as the one described above with reference to FIG. 11. If so, the address for the user supplied pointer is computed at step 1716. Subsequently, for each byte (step 1718), the debug interpreter 128 performs a series of steps (beginning with step 1720) to determine whether the byte is allocated or not. At step 1720 a byte in the address computed is written to the results buffer 136. The heap manager 150 is then called at step 1722 to determine whether the byte is free. The processing performed by the heap manager 150 at this stage is represented by step 1522 shown in FIG. 15 and may include accessing the freelist 152 and determining whether the byte in questions contained therein.

At step 1724 the debug interpreter 128 processes the results returned by the heap manager 150 to determine whether the byte is free. In one embodiment of the invention, a mask is utilized to record whether the byte is the free or allocated. Thus, if the byte is free a one (1) is written to the mask at step 1726 while, if the byte is allocated, a zero (0) is written to the mask at step 1728. Steps 1720 et al., are repeated for each byte in the address computed at step 1716. At step 1730, the results and the masks are returned to the user interface 124. The results may be output and displayed on a screen in the manner described above with reference to FIG. 7.

If step 1714 is answered negatively, the method 1700 proceeds to step 1732 and queries whether the user is requesting identification. If so, the associated allocators and deallocators are retrieved from the identification table 1200 at step 1734 and are then returned to the user interface 124 at step 1736.

If step 1732 is answered negatively, method 1700 proceeds to step 1738 where conventional processing is performed by the debug interpreter 128. The method 1700 then returns at step 1740.

While the foregoing is directed to the preferred embodiment of the present invention, other and further embodiments of the invention may be devised without departing from the basic scope thereof, and the scope thereof is determined by the claims that follow.

What is claimed is:

1. A method for debugging problems arising from misuse of memory available for dynamic allocation during execution of code, the code including a plurality of memory allocators and a plurality of memory deallocators, the method comprising:

for each deallocator called to free a memory block:
(i) determining an associated allocator responsible for allocating the memory block; and then
(ii) storing, in a data structure, a reference to the deallocator and a reference to the associated allocator; whereby a relationship between each deallocator called and each associated allocator is recorded;

receiving a user request to view a call to free memory allocated by a specific allocator referenced in the data structure;

in response to the user request, accessing the data structure to identify a call to a deallocator corresponding to the specific allocator; and displaying, through a debugger user interface, a location in the code where the call to the deallocator corresponding to the specific allocator was made.

2. The method of claim 1, wherein displaying the location in the code comprises displaying a line number in the code.

3. The method of claim 1, further comprising freeing the memory block.

* * * * *